United States Patent
Moon et al.

(10) Patent No.: US 8,195,178 B2
(45) Date of Patent: Jun. 5, 2012

(54) APPARATUS AND METHOD FOR ADJUSTING OFFSET IN A WIRELESS COMMUNICATION SYSTEM

(75) Inventors: Pil-Jae Moon, Seoul (KR); Jeong-Heon Kim, Anyang-si (KR); Seung-Joo Maeng, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 12/657,327

(22) Filed: Jan. 19, 2010

(65) Prior Publication Data

US 2010/0184446 A1 Jul. 22, 2010

(30) Foreign Application Priority Data

Jan. 20, 2009 (KR) .................. 10-2008-0004432

(51) Int. Cl.
*H04W 72/00* (2009.01)
*H04W 24/00* (2009.01)
*H04W 4/00* (2009.01)

(52) U.S. Cl. .................. 455/450; 455/423; 370/329

(58) Field of Classification Search .................. 455/423, 455/450; 370/329
See application file for complete search history.

(56) References Cited

U.S. PATENT DOCUMENTS

| 6,519,449 B1 * | 2/2003 | Zhang et al. ............. 455/69 |
| 2007/0232339 A1 * | 10/2007 | Ji et al. ..................... 455/502 |
| 2009/0034594 A1 * | 2/2009 | Zhang ....................... 375/222 |

FOREIGN PATENT DOCUMENTS

KR 10-2009-0090941 2/2008

* cited by examiner

*Primary Examiner* — Erika Gary
*Assistant Examiner* — Michael Mapa

(57) ABSTRACT

A Base Station (BS) includes an apparatus capable of performing an offset adjustment for a Mobile Station (MS). The BS can determine an offset mean value of the MS using a previously estimated offset of the MS if UpLink (UL) data received from the MS does not exist. The BS determines whether to transmit an unsolicited ranging response message (Unsolicited RNG-RSP) using the offset mean value of the MS. If transmitting the Unsolicited RNG-RSP, the BS transmits the MS the Unsolicited RNG-RSP including an offset adjustment value for the MS.

20 Claims, 4 Drawing Sheets

APPARATUS AND METHOD FOR ADJUSTING OFFSET IN A WIRELESS COMMUNICATION SYSTEM

CROSS REFERENCE TO RELATED APPLICATION(S) AND CLAIM OF PRIORITY

The present application claims priority under 35 U.S.C. §119(a) to a Korean Patent Application filed in the Korean Intellectual Property Office on Jan. 20, 2009 and assigned Serial No. 10-2008-0004432, the contents of which are herein incorporated by reference.

TECHNICAL FIELD OF THE INVENTION

The present invention relates to an apparatus and method for adjusting a timing offset and frequency offset of a Mobile Station (MS) in a wireless communication system. More particularly, the present invention relates to an apparatus and method for adjusting a timing offset and frequency offset of an MS using an unsolicited ranging response message (Unsolicited RNG-RSP) in a wireless communication system.

BACKGROUND OF THE INVENTION

An MS accessing a Base Station (BS) and in communication can cause a timing offset and a frequency offset depending on a position change. Thus, the BS adjusts the timing offset and frequency offset of the MS through periodical ranging.

In a periodical ranging mode, if not being allocated UpLink (UL) resources within a driving time of a timer, an MS transmits a periodic ranging code to a BS. That is, only if driving of the timer terminates, the MS transmits the periodical ranging code to the BS for the sake of periodical ranging. Alternatively, if being allocated the UL resources within the driving time of the timer, the MS reactivates the timer.

Thus, if an MS continuously transmits UL data, or transmits UL data before driving of a timer terminates, there is a problem that the MS fails to transmit a periodical ranging code and thus, cannot perform periodical ranging. For example, if a transmission period of a UL transmit power of an MS is shorter than a driving time of a timer for periodical ranging, there is a problem that the MS reactivates the timer whenever transmitting the UL transmit power and thus, cannot perform the periodical ranging.

SUMMARY OF THE INVENTION

To address the above-discussed deficiencies of the prior art, it is a primary object to provide at least the advantages below. Accordingly, one aspect of the present invention is to provide an apparatus and method for adjusting a timing offset and frequency offset of a Mobile Station (MS) using an unsolicited ranging response message (Unsolicited RNG-RSP) in a wireless communication system.

Another aspect of the present invention is to provide an apparatus and method for, although UpLink (UL) data does not exist, setting a frequency offset and timing offset to '0' and determining an offset mean value in a Base Station (BS) of a wireless communication system.

A further aspect of the present invention is to provide an apparatus and method for, although UL data does not exist, determining an offset mean value using a previously estimated frequency offset and timing offset in a BS of a wireless communication system.

The above aspects are achieved by providing an apparatus and method for adjusting an offset in a wireless communication system.

According to one aspect of the present invention, a method for controlling an offset adjustment for an MS in a BS of a wireless communication system is provided. The method includes determining an offset mean value of the MS using a previously estimated offset of the MS if UL data received from the MS does not exist, determining whether to transmit an Unsolicited RNG-RSP using the offset mean value of the MS, and, if transmitting the Unsolicited RNG-RSP, transmitting the MS the Unsolicited RNG-RSP including an offset adjustment value for the MS.

According to another aspect of the present invention, an apparatus for controlling an offset adjustment for an MS in a BS of a wireless communication system is provided. The apparatus includes a receive apparatus, an offset determiner, a controller, and a transmit apparatus. The receive apparatus receives a signal from the MS. If UL data received from the MS does not exist, the offset determiner determines an offset mean value of the MS using a previously estimated offset of the MS. The controller determines whether to transmit an Unsolicited RNG-RSP using the offset mean value of the MS. If transmitting the Unsolicited RNG-RSP, the transmit apparatus transmits the MS the Unsolicited RNG-RSP including an offset adjustment value for the MS.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Preferred embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

A technology for adjusting an offset of a Mobile Station (MS) using an unsolicited ranging response message (Unsolicited RNG-RSP) in a Base Station (BS) of a wireless communication system according to an exemplary embodiment of the present invention is described below. Here, the offset of the MS includes at least one of a timing offset and frequency offset of the MS.

In the case of using an Unsolicited RNG-RSP, a BS determines whether to transmit the Unsolicited RNG-RSP using an offset of an MS estimated through UpLink (UL) data received from the MS. Also, although there is no UL data, the BS can also determine an offset mean value and determine whether to transmit an Unsolicited RNG-RSP.

Figure 1:
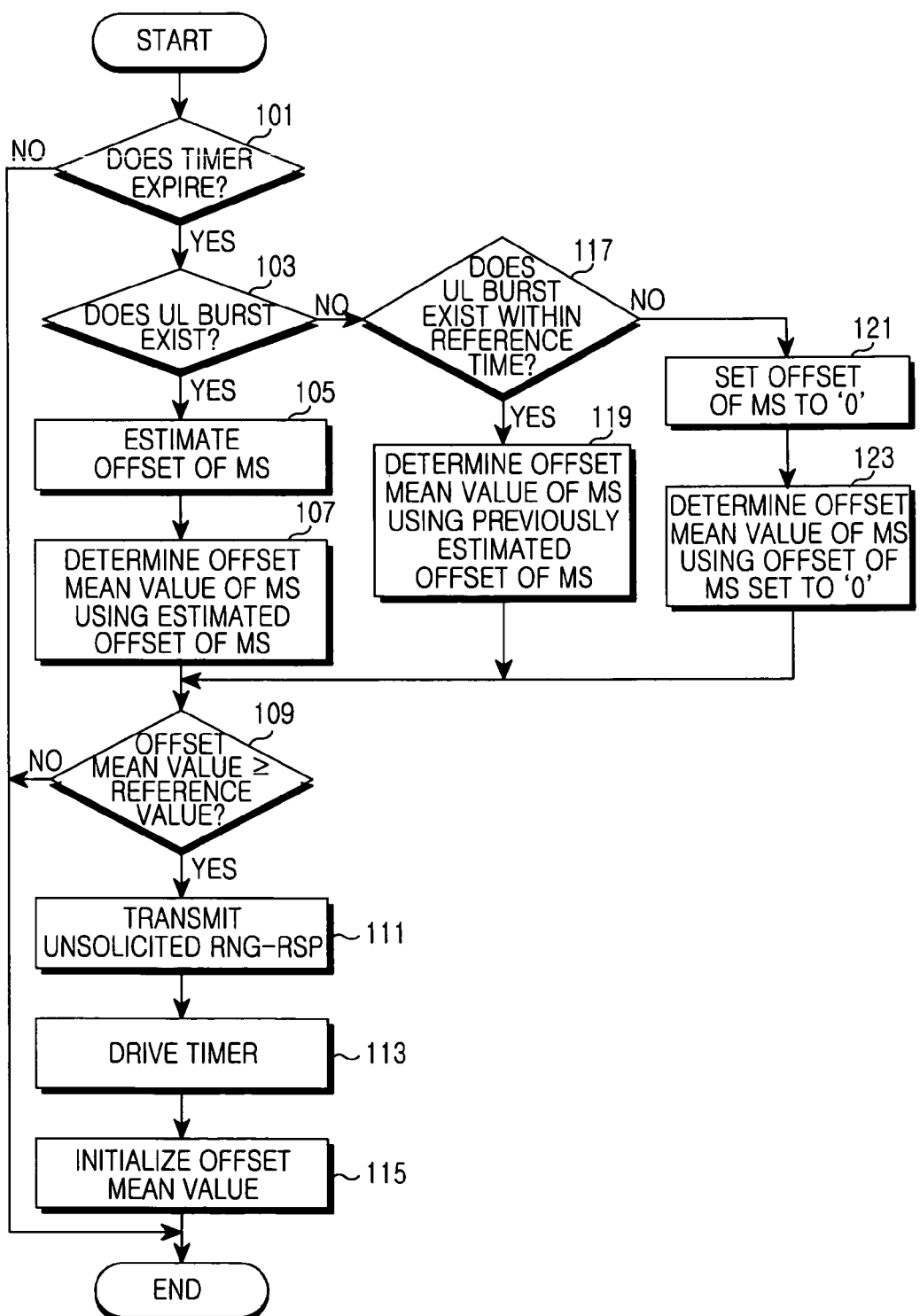
FIG. 1 illustrates a procedure for transmitting an unsolicited ranging response message (Unsolicited RNG-RSP) in a Base Station (BS) according to an exemplary embodiment of the present invention.

As illustrated in FIG. 1 below, if UL data does not exist, a BS determines an offset mean value using an offset of an MS set to '0' or using a previously estimated offset of the MS.

FIG. 1 illustrates a procedure for transmitting an Unsolicited RNG-RSP in a BS according to an exemplary embodiment of the present invention.

Referring to FIG. 1, in step 101, the BS identifies if a driving time of a timer expires. Here, the timer represents a timer driven for an MS to identify a time for adjusting an offset in response to an Unsolicited RNG-RSP sent by the BS. Accordingly, the timer is driven when the BS transmits the Unsolicited RNG-RSP.

If the driving time of the timer does not expire, the BS does not determine an offset mean value that is an index of determining transmitting of an Unsolicited RNG-RSP. Thus, the BS terminates the procedure according the exemplary embodiment of the present invention.

Alternatively, if the driving time of the timer expires, the BS proceeds to step 103 and identifies if a UL burst exists. That is, the BS identifies if UL data transmitted by the MS is received.

If the UL data exists, the BS proceeds to step 105 and estimates an offset of the MS using the UL data. In case that a BS includes a plurality of antennas, the BS determines a mean for an offset of an MS estimated through UL data received through each antenna. At this time, the BS can also set to '0' an offset of an MS estimated through UL data of a reception strength equal to or less than a reference value.

After estimating the offset of the MS, the BS proceeds to step 107 and determines an offset mean value of the MS using the estimated offset of the MS. For example, the BS determines the offset mean value of the MS through an Infinite Impulse Response (IIR) operation as in Equation 1 below. Here, the offset mean value of the MS includes at least one of a timing offset mean value and frequency offset mean value of the MS.

$$\text{offset\_mean}[n+1] = (1-\alpha) \times \text{offset\_mean}[n] + \alpha \times \text{offset\_current}$$

In Equation 1, the 'offset_mean[n]' represents an offset mean value of an n-$^{th}$ MS, the 'offset_current' represents the offset value of the MS estimated in step 105, and the '$\alpha$' represents a weight for determining a ratio of 'offset_current' to accumulation offset mean value to be applied at the time of determining the offset mean value of the MS.

If the UL data does not exist in step 103, the BS proceeds to step 117 and transmits an Unsolicited RNG-RSP and then, identifies if the UL data does not exist during a reference time. For example, the BS compares the number of times of continuous non-existence of UL data with the reference number of times. At this time, the BS identifies the number of times of continuous non-existence of UL data in a unit of a frame.

If the number of times of continuous non-existence of UL data is less than the reference number of times in step 117, the BS recognizes that the UL data exists within the reference time. Thus, the BS proceeds to step 119 and determines an offset mean value of the MS using a previously estimated offset of the MS. For example, the BS determines the offset mean value of the MS through an IIR operation that uses the latest estimated offset of the MS.

Alternatively, if the number of times of continuous non-existence of UL data is equal to or is less than the reference number of times in step 117, the BS recognizes that the UL data does not exist within the reference time. Thus, the BS proceeds to step 121 and sets an offset of the MS to '0'.

Then, the BS proceeds to step 123 and determines an offset mean value of the MS using the offset of the MS set to '0'. For example, the BS determines the offset mean value of the MS through an IIR operation that uses the 'offset_current' of Equation set to '0'.

After determining the offset mean value of the MS, the BS proceeds to step 109 and compares the offset mean value of the MS determined in step 107, 119, or 123 with a reference value, determining whether to transmit an Unsolicited RNG-RSP.

If the offset mean value of the MS is less than the reference value in step 109, the BS determines that the offset of the MS is not at a level for adjustment. Thus, the BS terminates the procedure according to the exemplary embodiment of the present invention.

Alternatively, if the offset mean value of the MS is equal to or is greater than the reference value in step 109, the BS proceeds to step 111 and transmits an Unsolicited RNG-RSP to the MS to adjust a frequency offset and timing offset of the MS.

After transmitting the Unsolicited RNG-RSP, the BS proceeds to step 113 and reactivates the timer.

Then, the BS proceeds to step 115 and initializes the offset mean value of the MS.

Then, the BS terminates the procedure according to the exemplary embodiment of the present invention.

Figure 2:
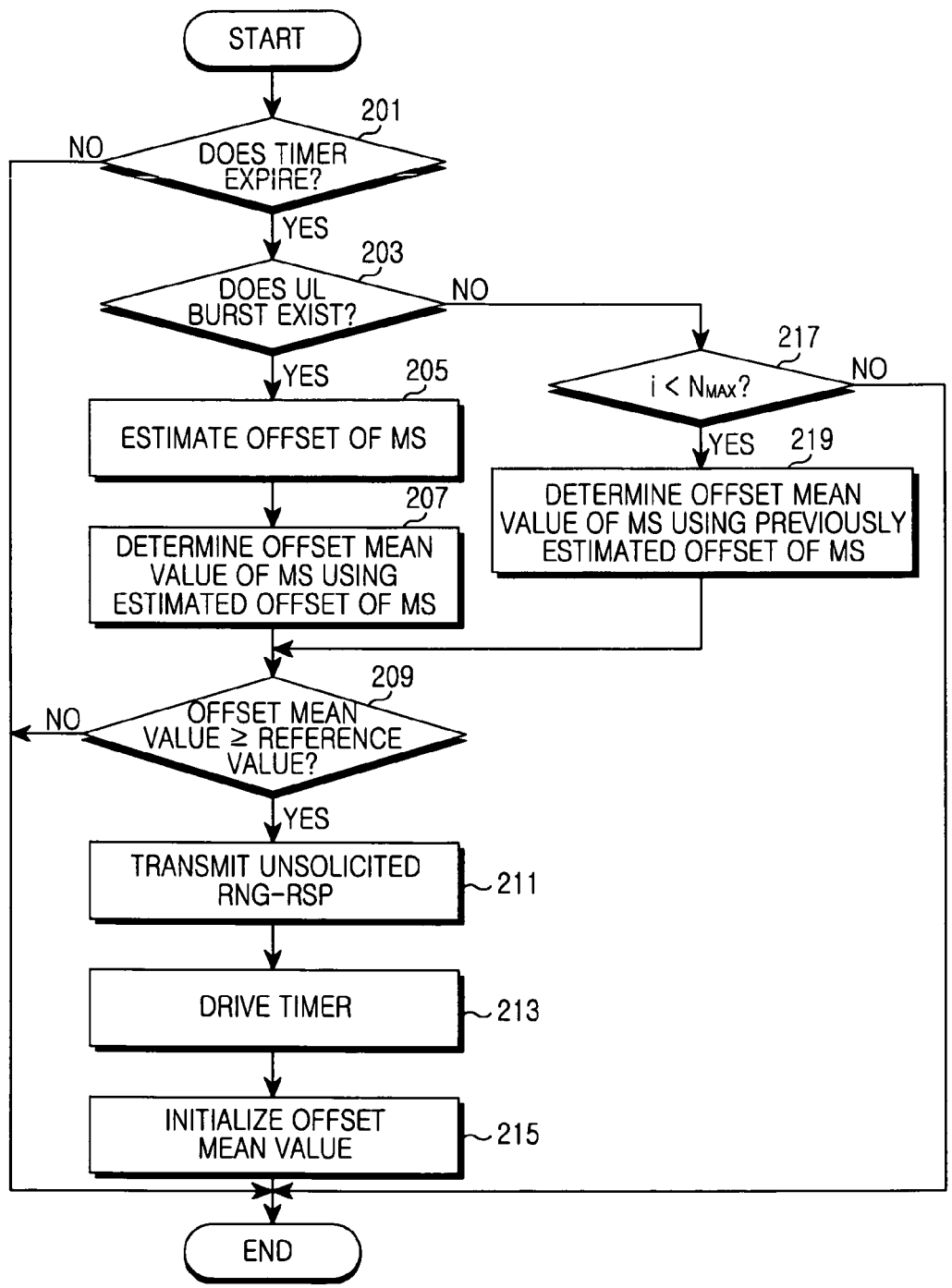
FIG. 2 illustrates a procedure for transmitting an Unsolicited RNG-RSP in a BS according to another exemplary embodiment of the present invention.

As illustrated in FIG. 2 below, if UL data does not exist, a BS determines an offset mean value of an MS using a previously estimated offset of the MS.

FIG. 2 illustrates a procedure for transmitting an Unsolicited RNG-RSP in a BS according to another exemplary embodiment of the present invention.

Referring to FIG. 2, in step 201, the BS identifies if a driving time of a timer expires. Here, the timer represents a timer driven for an MS to identify a time for adjusting an offset in response to an Unsolicited RNG-RSP sent by the BS. Accordingly, the timer is driven when the BS transmits the Unsolicited RNG-RSP.

If the driving time of the timer does not expire, the BS does not determine an offset mean value that is an index of determining transmitting of an Unsolicited RNG-RSP. Thus, the BS terminates the procedure according the exemplary embodiment of the present invention.

Alternatively, if the driving time of the timer expires, the BS proceeds to step 203 and identifies if UL data exists. That is, the BS identifies if the UL data transmitted by the MS is received.

If the UL data exists in step 203, the BS proceeds to step 205 and estimates an offset of the MS using the UL data. In case that a BS includes a plurality of antennas, the BS determines a mean for an offset of an MS estimated through UL data received through each antenna. At this time, the BS can also set to '0' an offset of an MS estimated through UL data of a reception strength equal to or less than a reference value.

After estimating the offset of the MS, the BS proceeds to step 207 and determines an offset mean value of the MS using the estimated offset of the MS. For example, the BS determines the offset mean value of the MS through an Infinite Impulse Response (IIR) operation as in Equation.

If the UL data does not exist in step 203, the BS proceeds to step 217 and compares the number (i) of times of transmitting an Unsolicited RNG-RSP with the maximum number of times of transmitting ($N_{MAX}$) using the offset mean value of the MS. Here, the maximum number of times of transmitting ($N_{MAX}$) represents the maximum number of times of transmitting an Unsolicited RNG-RSP set to prevent a BS from continuously transmitting an Unsolicited RNG-RSP if UL data does not exist because of an abnormal failure of communication between the BS and the MS. Also, the number (i) of times of transmitting the Unsolicited RNG-RSP represents the number of times of an Unsolicited RNG-RSP using an offset mean value of an MS if UL does not exist.

If the 'i' is equal to or is greater than the '$N_{MAX}$', the BS terminates the procedure according to the exemplary embodiment of the present invention.

Alternatively, if the 'i' is less than the '$N_{MAX}$', the BS proceeds to step 219 and determines an offset mean value of the MS using a previously estimated offset of the MS. For example, the BS determines the offset mean value of the MS through an IIR operation that uses the latest estimated offset of the MS.

After determining the offset mean value of the MS, the BS proceeds to step 209 and compares the offset mean value of the MS determined in step 207 or 219 with a reference value, determining whether to transmit an Unsolicited RNG-RSP.

If the offset mean value of the MS is less than the reference value in step 209, the BS determines that the offset of the MS is not at a level for adjustment. Thus, the BS terminates the procedure according to the exemplary embodiment of the present invention.

Alternatively, if the offset mean value of the MS is equal to or is greater than the reference value in step 209, the BS proceeds to step 211 and transmits an Unsolicited RNG-RSP to the MS to adjust an offset of the MS. For example, if transmitting the Unsolicited RNG-RSP using the offset mean value of the MS generated in step 207, the BS initializes the 'i'. For another example, if transmitting the Unsolicited RNG-RSP using the offset mean value of the MS generated in step 219, the BS increases the 'i' by one level (i++).

After transmitting the Unsolicited RNG-RSP, the BS proceeds to step 213 and reactivates the timer driven during a predetermined time such that the MS can adjust the offset in response to the Unsolicited RNG-RSP.

Then, the BS proceeds to step 215 and initializes the offset mean value of the MS.

Then, the BS terminates the procedure according to the exemplary embodiment of the present invention.

In the aforementioned exemplary embodiment, when an offset mean value of an MS is equal to or is greater than a reference value, a BS transmits an Unsolicited RNG-RSP to the MS. At this time, the BS can also transmit the Unsolicited RNG-RSP to the MS when the offset mean value is greater than the reference value according to a reference value setting method.

An Unsolicited RNG-RSP sent by a BS includes ranging state information. Thus, an MS operates depending on the ranging state information included in the Unsolicited RNG-RSP. For example, if the ranging state information is a success, the MS adjusts an offset of the MS as much as an offset adjustment value of the Unsolicited RNG-RSP and the, terminates an offset adjustment procedure. Alternatively, if the ranging state information is a continuation, the MS adjusts an offset of the MS as much as the offset adjustment value of the Unsolicited RNG-RSP and then, transmits a periodical ranging code to the BS.

The following description is made for a construction of a BS for adjusting an offset of an MS using an Unsolicited RNG-RSP.

Figure 3:
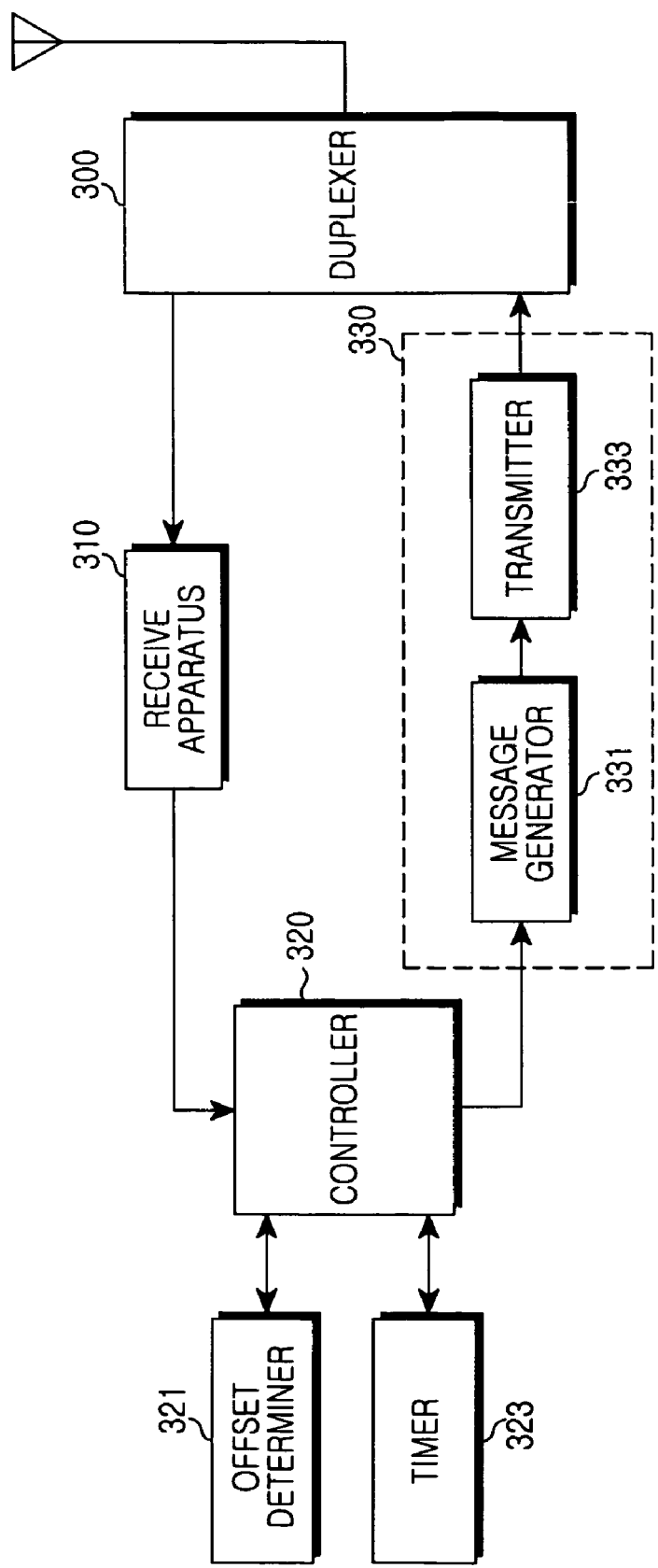
FIG. 3 illustrates a construction of a BS according to an exemplary embodiment of the present invention.

FIG. 3 illustrates a construction of a BS according to an exemplary embodiment of the present invention.

As illustrated in FIG. 3, the BS includes a duplexer 300, a receive apparatus 310, a controller 320, and a transmit apparatus 330.

According to a duplexing scheme, the duplexer 300 transmits a transmit signal received from the transmit apparatus 330 through an antenna, and provides a receive signal from the antenna to the receive apparatus 310. For example, if using a Time Division Duplex (TDD) scheme, the duplexer 300 transmits a transmit signal received from the transmit apparatus 330 through the antenna during a transmission duration. Alternatively, the duplexer 300 provides a receive signal from the antenna to the receive apparatus 310 during a reception duration.

The receive apparatus 310 processes a high frequency signal received from the duplexer 300. For example, the receive apparatus 310 includes a Radio Frequency (RF) processing module, a demodulation module, and a message processing module. The RF processing module converts a high frequency signal (RF) received from the duplexer 300 into a baseband signal. The demodulation module demodulates the baseband signal received from the RF processing module according to a communication scheme with an MS. The message processing module extracts a control message included in the signal received from the demodulation module and transmits the control message to the controller 320.

The controller 320 adjusts an offset of an MS that provides service. That is, if a periodical ranging code is received from the MS, the controller 320 transmits a ranging response message including an offset adjustment value for the MS. Alternatively, in the case of using an Unsolicited RNG-RSP, although a periodical ranging code is not received from an MS, the controller 320 transmits an Unsolicited RNG-RSP including an offset adjustment value for the MS depending on an offset mean value of the MS. For example, if a driving time of a timer 323 expires, the controller 320 controls an offset determiner 321 to determine the offset mean value of the MS.

Thereafter, the controller 320 determines whether to transmit the Unsolicited RNG-RSP using the offset mean value of the MS received from the offset determiner 321.

If determining to transmit an Unsolicited RNG-RSP, the controller 320 reactivates the timer 323.

The offset determiner 321 determines an offset mean value of an MS under control of the controller 320. For example, if receiving UL data from the controller 320, the offset determiner 321 estimates an offset of the MS through the UL data. Thereafter, the offset determiner 321 determines an offset mean value of the MS through an IIR operation that uses the estimated offset of the MS.

For another example, if the UL data does not exist, the offset determiner 321 sets an offset of the MS to '0'. Thereafter, the offset determiner 321 determines an offset mean value of the MS through an IIR operation that uses the offset of the MS set to '0'.

For further example, if the UL data does not exist, the offset determiner 321 determines an offset mean value of the MS through an IIR operation that uses a previously estimated offset of the MS. At this time, the offset determiner 321 determines the offset mean value of the MS using the latest estimated offset of the MS.

The timer 323 is driven during a predetermined time if being driven under control of the controller 320.

The transmit apparatus 330 includes a message generator 331 and a transmitter 333.

The message generator 331 generates a message for adjusting an offset of an MS under control of the controller 320. If a periodical ranging code is received from the MS, the message generator 331 generates a ranging response message including an offset adjustment value for the MS. Alternatively, if the controller 320 determines to transmit an Unsolicited RNG-RSP depending on an offset mean value of an MS, the message generator 331 generates an Unsolicited RNG-RSP including an offset adjustment value for the MS.

The transmitter 333 transmits transmission data and a control message generated in the message generator 331. For example, the transmitter 333 includes a modulation module and an RF processing module. At this time, the modulation module modulates transmission data and a control message received from the message generator 331 according to a communication scheme with an MS. The RF processing module converts a signal received from the modulation module into a high frequency signal.

In the aforementioned construction, the controller 320 can perform functions of the offset determiner 321 and the timer 323. These are separately constructed and shown in order to distinguish and describe respective functions in the present invention. Thus, in an actual realization, construction can be such that all of them are processed in the controller 320, and construction can be such that only part of them is processed in the controller 320.

The following description is made for a detailed construction of the offset determiner 321 for determining an offset mean value of an MS in a BS.

Figure 4:
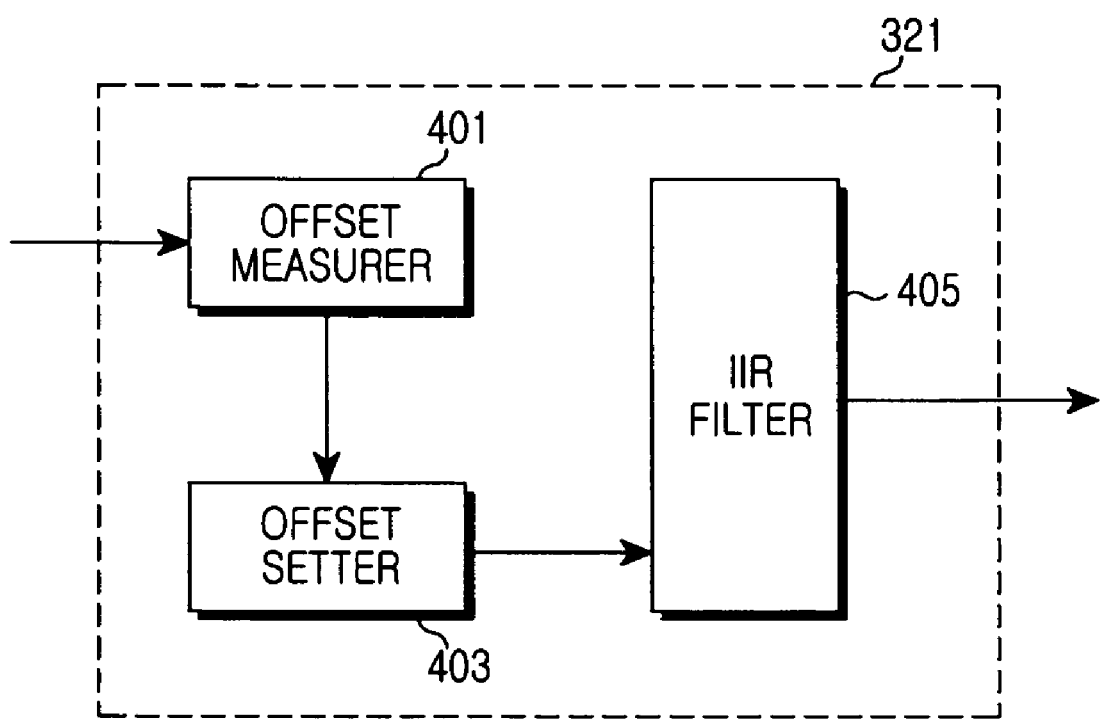
FIG. 4 illustrates a detailed construction of an offset determiner constituting a BS according to an exemplary embodiment of the present invention.

FIG. 4 illustrates a detailed construction of an offset determiner constituting a BS according to an exemplary embodiment of the present invention.

As illustrated in FIG. 4, the offset determiner 321 includes an offset estimator 401, an offset setter 403, and an IIR filter 405.

The offset estimator 401 estimates an offset of an MS using UL data received from the controller 320.

The offset setter 403 determines an offset of an MS to be provided to the IIR filter 405 depending on the existence and non-existence of UL data. For example, if the UL data exists, the offset setter 403 transmits an offset of the MS received from the offset estimator 401, to the IIR filter 405.

For another example, if the UL data does not exist, the offset setter 403 transmits an offset of the MS set to '0', to the IIR filter 405.

For further example, if the UL data does not exist, the offset setter 403 transmits an offset of the MS previously estimated in the offset estimator 401, to the IIR filter 405. At this time, the offset setter 403 transmits the latest offset of the MS estimated in the offset estimator 401, to the IIR filter 405.

The IIR filter 405 determines an offset mean value of an MS using the offset of the MS received from the offset setter 403. For example, the IIR filter 405 determines the offset mean value of the MS using Equation above.

As described above, an exemplary embodiment of the present invention can advantageously quickly adjust a timing offset and frequency offset of an MS in movement by, although UL data does not exist, adjusting the timing offset and frequency offset of the MS using an offset mean value determined using a previously estimated timing offset and frequency offset in a BS of a wireless communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling an offset adjustment for a Mobile Station (MS) by a Base Station (BS) of a wireless communication system, the method comprising:
if UpLink (UL) data received from the MS does not exist, determining an offset mean value of the MS using a previously estimated offset of the MS;
determining whether to transmit an unsolicited ranging response message (Unsolicited RNG-RSP) using the offset mean value of the MS; and
if it is determined to transmit the Unsolicited RNG-RSP, transmitting to the MS the Unsolicited RNG-RSP, wherein the Unsolicited RNG-RSP includes an offset adjustment value for the MS.

2. The method of claim 1, wherein the offset of the MS includes at least one of a timing offset and frequency offset of the MS, and
wherein the offset mean value of the MS includes at least one of a timing offset mean value and frequency offset mean value of the MS.

3. The method of claim 1, further comprising, before determining the offset mean value of the MS, identifying the number of times of continuously transmitting an Unsolicited RNG-RSP using an offset mean value of the MS determined in a state of non-existence of UL data,
whereby, if the number of times of continuously transmitting the Unsolicited RNG-RSP does not exceed the reference number of times, determining the offset mean value of the MS.

4. The method of claim 1, wherein the determining of the offset mean value of the MS comprises determining the offset mean value of the MS through an Infinite Impulse Response (IIR) operation that applies the latest estimated offset of the MS.

5. The method of claim 1, further comprising, after transmitting the Unsolicited RNG-RSP, initializing the offset mean value of the MS.

6. The method of claim 1, further comprising, after transmitting the Unsolicited RNG-RSP, reactivating a timer driven during a reference time, and not determining an offset mean value of the MS until driving of the timer terminates.

7. The method of claim 1, further comprising: if the UL data received from the MS exists,
estimating an offset of the MS using the UL data; and
determining an offset mean value of the MS using the offset of the MS,
whereby determining whether to transmit an Unsolicited RNG-RSP using the offset mean value of the MS.

8. The method of claim 1, further comprising, if the UL data received from the MS does not exist, comparing the number of times of continuous non-existence of UL data with the reference number of times,
wherein, if the number of times of continuous non-existence of UL data is less than the reference number of times, determining the offset mean value of the MS using the previously estimated offset of the MS.

9. The method of claim 8, further comprising: if the number of times of continuous non-existence of UL data is equal to or is greater than the reference number of times,
setting an offset of the MS to '0'; and
determining an offset mean value of the MS using the offset of the MS set to '0', and
whereby determining whether to transmit the Unsolicited RNG-RSP using the determined offset mean value of the MS.

10. The method of claim 9, wherein the determining of the offset mean value of the MS comprises determining the offset mean value of the MS through an IIR operation that applies the offset of the MS set to '0'.

11. An apparatus for use in a Base Station (BS) of a wireless communication system, the apparatus capable of controlling an offset adjustment for a Mobile Station (MS), the apparatus comprising:
a receive apparatus configured to receive a signal from the MS;
an offset determiner configured to determine an offset mean value of the MS using a previously estimated offset of the MS, if UpLink (UL) data received from the MS does not exist;
a controller configured to determine whether to transmit an unsolicited ranging response message (Unsolicited RNG-RSP) using the offset mean value of the MS; and
a transmit apparatus configured to send the MS the Unsolicited RNG-RSP, if transmitting the Unsolicited RNG-RSP,
wherein the Unsolicited RNG-RSP includes an offset adjustment value for the MS.

12. The apparatus of claim 11, wherein the offset of the MS includes at least one of a timing offset and frequency offset of the MS, and
wherein the offset mean value of the MS includes at least one of a timing offset mean value and frequency offset mean value of the MS.

13. The apparatus of claim 11, wherein the offset determiner comprises:
an offset estimator configured to estimate an offset of the MS using the UL data, if UL data exists;
an offset setter configured to transmit the offset of the MS estimated in the offset estimator to an offset mean value determiner, if the UL data exists and transmit the latest offset of the MS estimated in the offset estimator to the offset mean value determiner, if the UL data does not exist; and
the offset mean value determiner configured to determine the offset mean value of the MS through an Infinite Impulse Response (IIR) operation that applies the offset of the MS received from the offset setter.

14. The apparatus of claim 11, wherein, if the number of times of continuously transmitting an Unsolicited RNG-RSP using an offset mean value of the MS determined in a state of non-existence of UL data does not exceed the reference number of times, the controller is configured to control to determine the offset mean value of the MS.

15. The apparatus of claim 11, wherein, after transmitting the Unsolicited RNG-RSP,
the controller is configured to initialize the offset mean value of the MS and reactivate a timer driven during a reference time, and not determine an offset mean value of the MS until a driving of the timer terminates.

16. The apparatus of claim 11, wherein, if the number of times of continuous non-existence of UL data is less than the reference number of times, the offset determiner is configured to determine the offset mean value of the MS using the previously estimated offset of the MS.

17. The apparatus of claim 11, wherein, if the number of times of continuous non-existence of UL data is equal to or is greater than the reference number of times, the offset determiner is configured to determine an offset mean value of the MS using an offset of the MS set to '0'.

18. The apparatus of claim 17, wherein the offset determiner comprises:
an offset estimator configured to, if UL data exists, estimate an offset of the MS using the UL data;
an offset setter configured to, if the UL data exists, transmit the offset of the MS estimated in the offset estimator to an offset mean value determiner and, if the UL data does not exist, transmit the offset of the MS set to '0' to the offset mean value determiner; and
the offset mean value determiner configured to determine the offset mean value of the MS through an IIR operation that applies the offset of the MS received from the offset setter.

19. A Base Station (BS) capable of controlling an offset adjustment for a Mobile Station (MS), the BS comprising:
a receiver configured to receive a signal from the MS;
an offset determiner configured to determine an offset mean value of the MS using a previously estimated offset of the MS, if UpLink (UL) data received from the MS does not exist;
a controller configured to determine whether to transmit an unsolicited ranging response message (Unsolicited RNG-RSP) using the offset mean value of the MS; and
a transmitter configured to send the MS the Unsolicited RNG-RSP, if transmitting the Unsolicited RNG-RSP,
wherein the Unsolicited RNG-RSP includes an offset adjustment value for the MS.

20. The BS of claim 19, wherein the offset of the MS includes at least one of a timing offset and frequency offset of the MS, and
wherein the offset mean value of the MS includes at least one of a timing offset mean value and frequency offset mean value of the MS.

* * * * *